United States Patent
Jarvis et al.

(10) Patent No.: US 8,086,792 B2
(45) Date of Patent: *Dec. 27, 2011

(54) DEMOTING TRACKS FROM CACHE

(75) Inventors: Thomas Charles Jarvis, Tucson, AZ (US); Michael Howard Hartung, Tucson, AZ (US); Karl Allen Nielsen, Tucson, AZ (US); Jeremy Michael Pinson, Tucson, AZ (US); Steven Robert Lowe, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 11/736,760

(22) Filed: Apr. 18, 2007

(65) Prior Publication Data
US 2007/0186047 A1    Aug. 9, 2007

Related U.S. Application Data

(63) Continuation of application No. 10/843,150, filed on May 10, 2004, now Pat. No. 7,421,535.

(51) Int. Cl.
*G06F 11/16* (2006.01)

(52) U.S. Cl. ........ 711/113; 711/118; 711/135; 711/144; 711/156

(58) Field of Classification Search .................. 711/113, 711/118, 135, 144, 156
See application file for complete search history.

(56) References Cited

U.S. PATENT DOCUMENTS

| | | | | |
|---|---|---|---|---|
| 4,916,605 A | * | 4/1990 | Beardsley et al. | 711/162 |
| 4,920,536 A | * | 4/1990 | Hammond et al. | 714/5.1 |
| 5,390,186 A | | 2/1995 | Murata et al. | |
| 5,542,066 A | | 7/1996 | Mattson et al. | |
| 5,636,359 A | * | 6/1997 | Beardsley et al. | 711/122 |
| 5,815,656 A | * | 9/1998 | Candelaria et al. | 714/54 |
| 5,941,998 A | * | 8/1999 | Tillson | 714/54 |
| 6,044,444 A | * | 3/2000 | Ofek | 711/162 |
| 6,119,209 A | * | 9/2000 | Bauman et al. | 711/162 |
| 6,134,610 A | * | 10/2000 | Chung | 710/55 |
| 6,134,634 A | * | 10/2000 | Marshall et al. | 711/143 |
| 6,192,450 B1 | | 2/2001 | Bauman et al. | |
| 6,425,050 B1 | * | 7/2002 | Beardsley et al. | 711/113 |
| 6,567,888 B2 | * | 5/2003 | Kedem | 711/113 |
| 6,785,771 B2 | | 8/2004 | Ash et al. | |
| 6,854,022 B1 | * | 2/2005 | Thelin | 710/5 |
| 6,948,033 B2 | | 9/2005 | Ninose et al. | |
| 7,171,610 B2 | * | 1/2007 | Ash et al. | 714/799 |
| 7,360,112 B2 | * | 4/2008 | Durica et al. | 714/5.11 |
| 7,421,535 B2 | * | 9/2008 | Jarvis et al. | 711/113 |
| 2002/0199067 A1 | * | 12/2002 | Patel et al. | 711/145 |
| 2008/0250200 A1 | * | 10/2008 | Jarvis et al. | 711/113 |

OTHER PUBLICATIONS

America National Standard, "Information Technology—SCSI Block Commands—2 (SBC-2)", Working Draft, Project T10/1417-D, Revision 13, Mar. 20, 2004, pp. 80-82 and 93-95.*

Tanenbaum, A.S., "Structured Computer Organization", 2nd Ed., 1984, Prentice-Hall, Inc., Englewood Clifs, NJ, 5 pp.

* cited by examiner

*Primary Examiner* — Sanjiv Shah
*Assistant Examiner* — Samuel Dillon
(74) *Attorney, Agent, or Firm* — David W. Victor; Konrad Raynes and Victor LLP

(57) ABSTRACT

Provided are a method, system, and program for destaging a track from cache to a storage device. The destaged track is retained in the cache. Verification is made of whether the storage device successfully completed writing data. Indication is made of destaged tracks eligible for removal from the cache that were destaged before the storage device is verified in response to verifying that the storage device is successfully completing the writing of data.

30 Claims, 6 Drawing Sheets

DEMOTING TRACKS FROM CACHE

CROSS-REFERENCE TO RELATED APPLICATIONS

This application is a continuation of U.S. patent application Ser. No. 10/843,150, filed on May 10, 2004, which application is incorporated herein by reference in its entirety.

BACKGROUND OF THE INVENTION

1. Field of the Invention

The present invention relates to a method, system, and program for demoting tracks from cache.

2. Description of the Related Art

When data is successfully written to a hard disk drive, the drive returns a write complete message to the host system that initiated the write operation. However, if the read/write head of the hard disk drive is not operating properly, the disk drive may return a write complete without actually writing the data to the disk. In large enterprise storage systems, the disk drive may return a complete to a destage of updated data to the drives. If the read/write head does not write the data even though complete is returned, the data is lost and recovery may not be possible using error correction techniques or Redundant Array of Independent Disk (RAID) algorithms because the data was never written to the disk. This type of error is called a "dropped write" error. Further, once a read/write head starts dropping writes, typically all writes following the failed write will also be dropped.

Dropped write errors may corrupt the parity data because the parity data for the dropped write is inconsistent with the data on the drive, which does not include the dropped write. Subsequently calculated parity based on the block to which the dropped data should have been written would be corrupt because it is not calculated using the dropped data, thereby preventing recovery and reconstruction of the dropped data using the parity data.

SUMMARY

Provided are a method, system, and program for destaging a track from cache to a storage device. The destaged track is retained in the cache. Verification is made of whether the storage device successfully completed writing data. Indication is made of destaged tracks eligible for removal from the cache that were destaged before the storage device is verified in response to verifying that the storage device is successfully completing the writing of data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
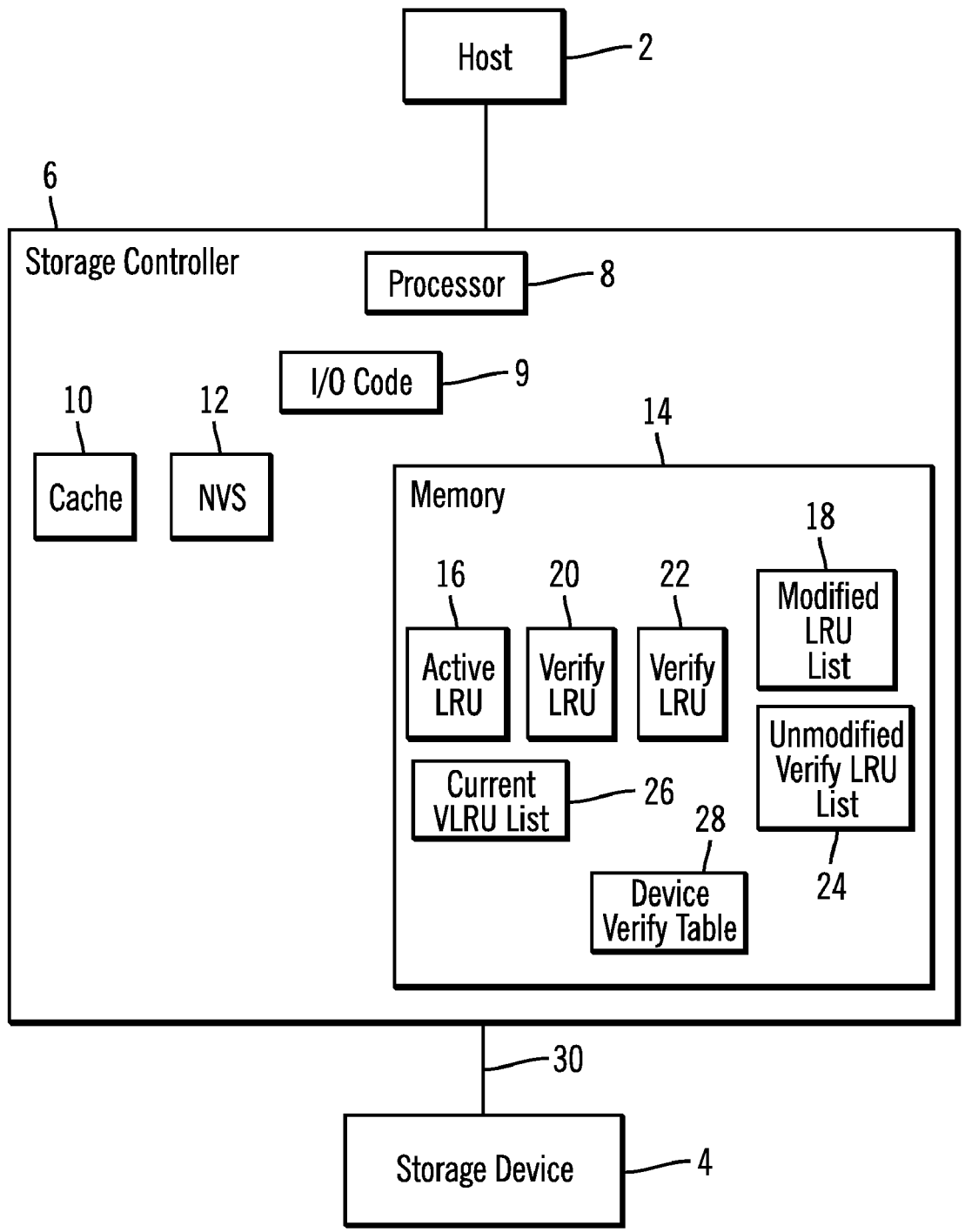
FIG. 1 illustrates a computing environment in which embodiments are implemented.

FIG. 1 illustrates a computing environment in which aspects of the invention are implemented. A host system 2 communicates Input/Output (I/O) requests to a storage device 4 through a storage controller 6. The host 2 may communicate with the storage controller 6 via a network, such as a Local Area Network (LAN), Storage Area Network (SAN), Wide Area Network (WAN), wireless network, etc. Alternatively, the host 2 may communicate with the storage controller 6 over a bus interface, such as a Peripheral Component Interconnect (PCI) bus. The host 2, storage system 8, and storage controller 6 may be housed in separate housings or be included in the same housings and connect via one or more bus interfaces. The storage controller 6 may comprise any storage management system known in the art, such as a storage controller, server, enterprise storage server, etc. Still further, the storage controller 6 may be implemented in a chip set in the host 2 or in an expansion card in an expansion card slot of the host 2. Yet further, the host 2 and storage controller 6 may comprise blades in a blade server. The storage device 4 may comprise any storage system known in the art, such as a single storage unit, e.g., hard disk drive, tape drive, optical disk drive, etc., or a Direct Access Storage Device (DASD), Just a Bunch of Disks (JBOD), a Redundant Array of Independent Disks (RAID), virtualization device, tape storage, optical disk storage, or any other storage system known in the art. The host 2 may comprise any computing device known in the art, such as a workstation, desktop computer, server, mainframe, handheld computer, telephony device, etc.

The storage controller 6 may include a processor 8 and a cache 10. The cache 10 is comprised of one or more volatile memory devices. The storage controller 6 buffers updates to data blocks in the storage device 4 in the cache 10 before writing the updates to the storage device. A "data block" comprises any known accessible unit of data known in the art, such as a byte at a Logical Block Address (LBA), a track, a fraction of a byte, etc. Data stored in the cache 10 may also be backed up in a non-volatile storage unit 12. The I/O code 9 includes the code to manage the storage of data in the cache 10 and the destaging of data to the storage device 4.

The storage controller 6 further includes a memory 14 or some type of buffers maintaining the following queues and data structures to manage I/O requests, including:

Active Least Recently Used (LRU) List 16: includes entries associated with received I/O requests that are actively being processed and the data for such I/O requests remains in cache 10.

Modified LRU List 18: includes entries associated with a write request whose data to write to the storage device 4 remains in cache 10 and has not yet been destaged from cache 10.

Verify LRU Lists 20, 22: includes entries associated with write data remaining in cache 10 after the write data is destaged and completed but before the write to the storage device 4 has been verified.

Unmodified Verify LRU List 24: includes entries associated with a write request previously on one of the verify LRU lists 20, 22 whose data was verified as being written to the storage device 4 and is eligible for demotion from the cache 10.

Current Verify LRU (VLRU) List 26: Indicates the current verify LRU list 20, 22 to which entries are added that are associated with write data written to the storage device 4 that is not yet verified.

Device Verify Table 28: In hard disk drive embodiments, includes information for each read/write head in a hard disk drive indicating whether the read/write head has written data and whether the read/write head was verified.

Figure 2:
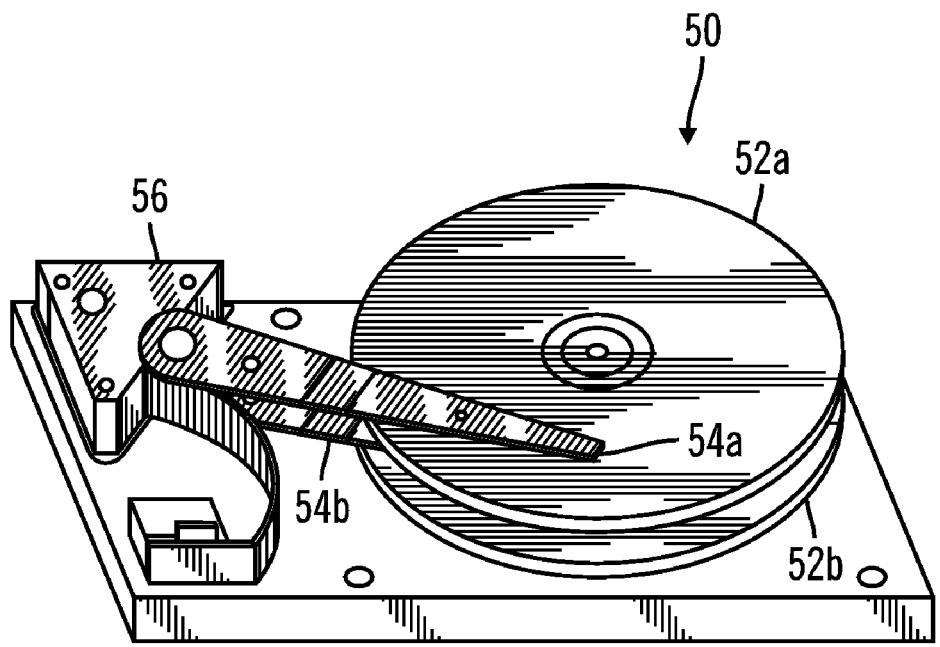
FIG. 2 illustrates a hard disk drive as known in the prior art.

FIG. 2 illustrates components of a hard disk drive 50 as known in the art, including a plurality of platters 52*a*, 52*b*, which may include data on both sides of the platters 52*a*, 52*b*, and read write heads 54*a*, 54*b*, where there may be heads on both sides of every platter 52*a*, 52*b*. Disk drive electronics 56 position the read/write heads at different locations on the platters 52*a*, 52*b* to perform read/write and other disk operations.

Figure 3:
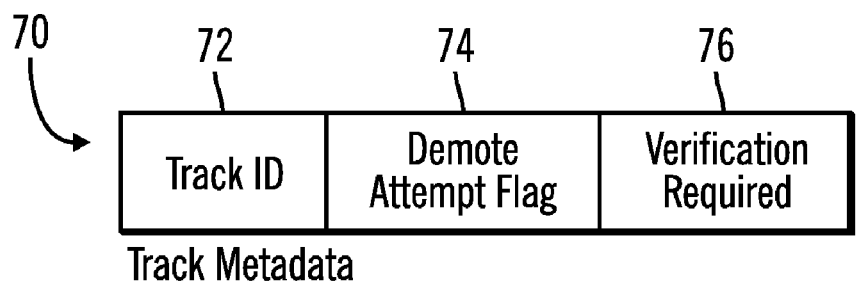
FIGS. 3 and 4 illustrate track metadata and head verify information.

FIG. 3 illustrates an example of track metadata 70 maintained for each track in cache 10, where entries associated with the track may be on one of the LRU lists 16, 18, 20, 22, 24. The track metadata 70 includes a track identifier (ID) 72 identifying the track in cache 10, a demote attempt flag 74 indicating whether an attempt was made to demote the track from cache 10 before the storage device 4 was verified; and a verification required flag 76 indicating whether the track must be verified as having been written to the storage device 4 before being eligible for demotion.

Figure 4:
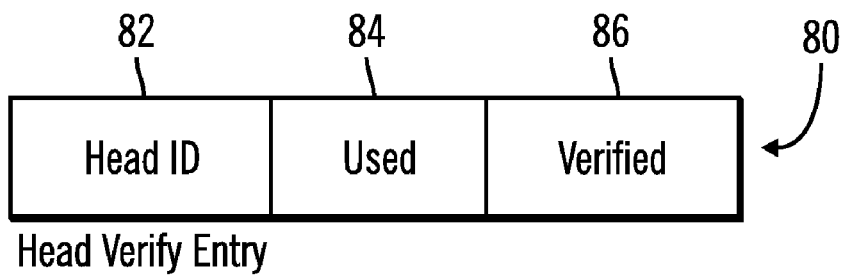
Figure 5:
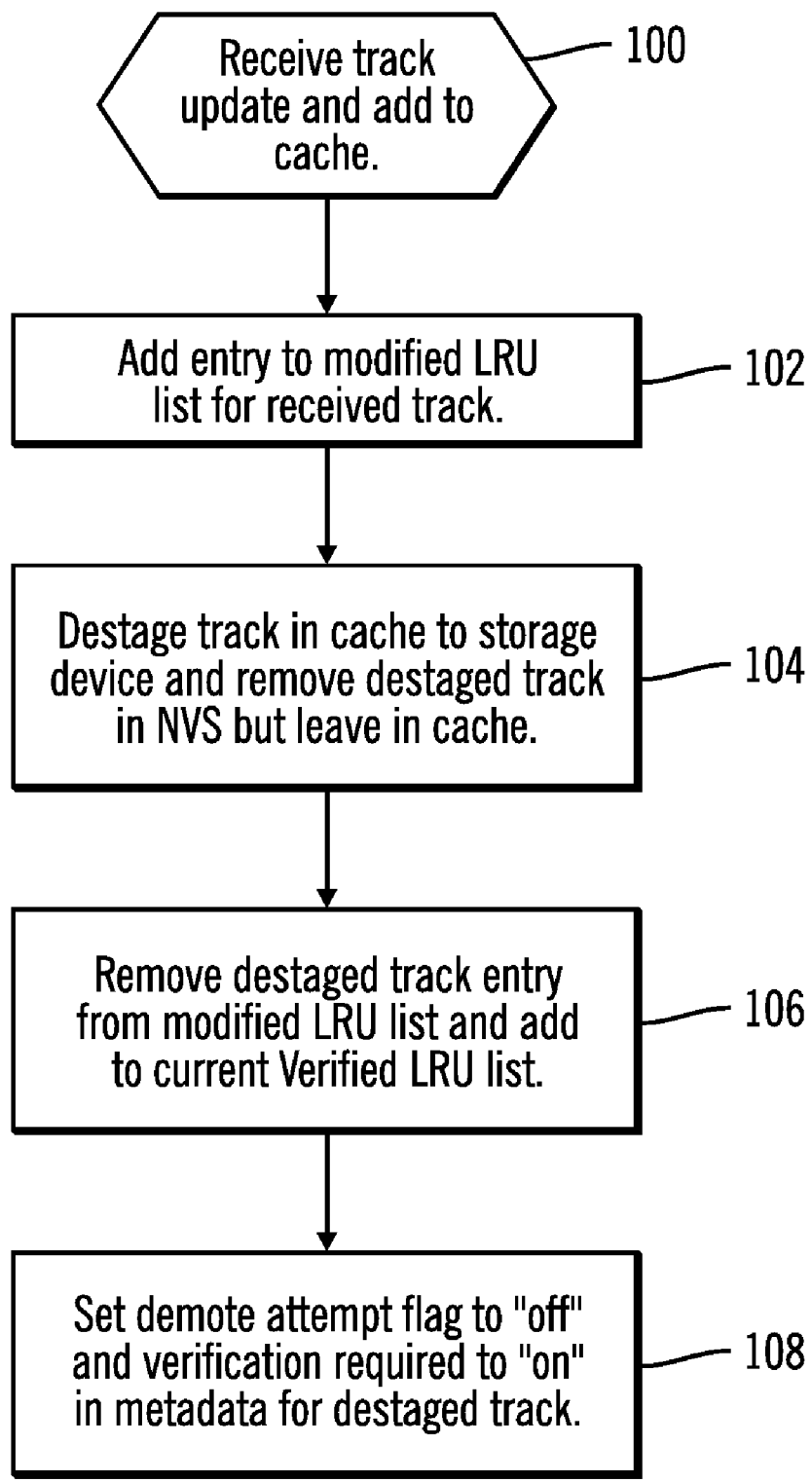
FIGS. 5, 6, 7, and 8 illustrate operations to destage and demote data in cache.

FIG. 4 illustrates an example of an entry 80 in the device verify table 28 maintained for each read/write head in the storage device that needs to be verified. The entries include a head identifier (ID) 82 identifying a particular head in a disk drive unit. If there are multiple disk drives in the storage device 4, then the head ID 82 would identify the particular disk drive in which the head is included. A used flag 84 indicates whether the head was used and a verify flag 86 indicates whether the head was verified. A write to the storage device 4 is verified if all heads have been have been verified since the write data was in cache 10 pending the verification.

FIGS. 5, 6, 7, and 8 illustrate operations performed by storage controller 6 executing the I/O code 9 to manage updates to tracks in the storage device 4 in the cache 10. With respect to FIG. 5, control begins upon receiving (at block 100) a track update and adding the update to cache 10. An entry is added (at block 102) to the modified LRU list 18 for the received track. The track in cache 10 is then destaged (at block 104) to the storage device 4 and the destaged track is removed from the NVS 12 but left in cache 10 until the heads of the storage device 4 are verified. The destaged track entry is removed (at block 106) from the modified LRU list 18 and added to the current verified LRU list 20, 22 indicated in the current VRLU list 26. The verification required flag 76 for the track is set (at block 108) to "on" indicating that the heads need to be verified before the track may be demoted and the demote attempt flag 74 is set to "off" indicating that an attempt has not been made to demote the track in cache 10 while the track is waiting verification that the data was successfully written, which means in certain embodiments, that all the heads being used were verified.

In certain situations, an update may be received to a track having an entry in one of the VLRU lists 20 and 22. In such case, the updated track entry may be removed from the VLRU list 20, 22 and then added to the modified LRU list 18 and processed accordingly.

Figure 6:
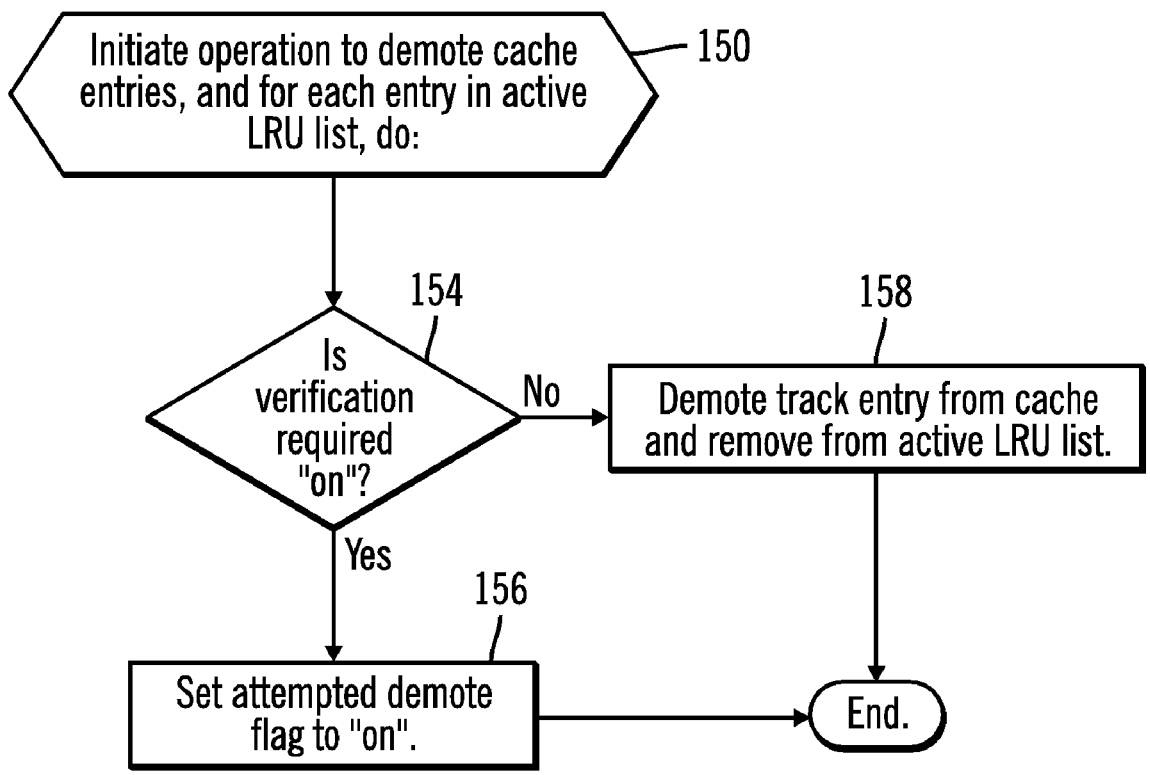

FIG. 6 illustrates operations to demote tracks in cache 10, where tracks may be demoted as part of an LRU operation to make room for new tracks being staged into cache 10. In certain embodiments, tracks are not subject to demotion from cache 10 until they have been destaged to the storage device 4. For each track entry in the active LRU list 16 (at block 150), operations 154, 156, and 158 are performed. If (at block 154) the verification required flag 76 in the track metadata 70 for the accessed track entry in the active LRU list 16 indicates that verification is needed, then the demote attempt flag 74 is set (at block 156) "on". This indicates that an attempt to demote the track from cache 10 was made, but that the demotion failed because the track had not yet been verified. If the verification required 76 flag is "off", then the track entry from cache 19 is demoted (at block 158) and the entry for the demoted track is removed from the active LRU list 16.

Figure 7:
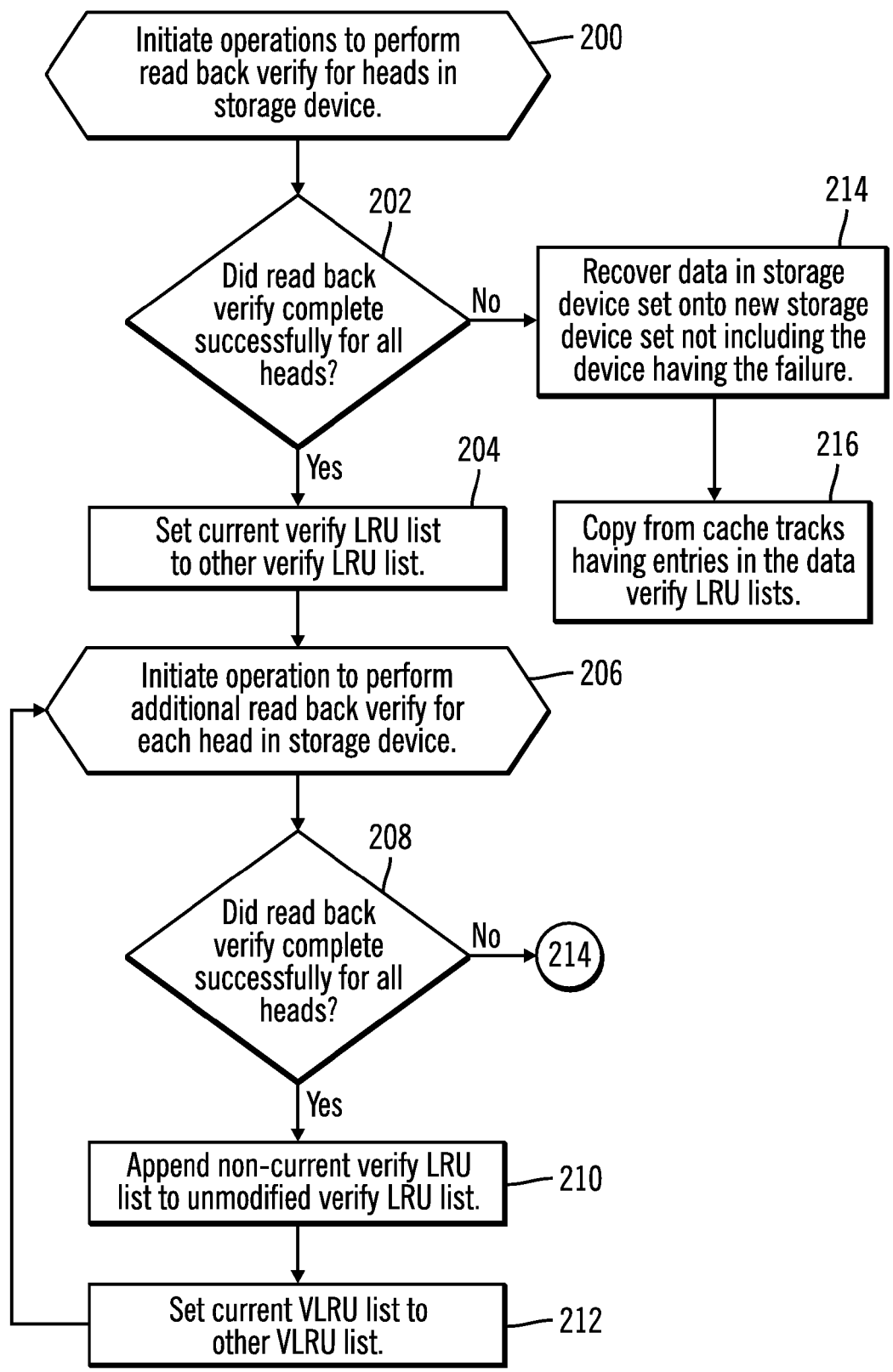

FIG. 7 illustrates operations performed to verify that the data was successfully written, or that the read/write heads are working properly. At block 200, the storage controller 6 initiates operations to perform write and read back verify for heads in the storage device. For instance, the storage controller 6 may periodically perform a read back verify of an update written to the storage device 4 and when doing the read back verify determine which head was verified. In certain embodiments, only heads that have been used are subject to verification, as indicated in the used 84 field. The verify flag 86 for that head on which the read back verify was performed is then set to "on". For instance, if the connection between the storage controller 6 and storage device 4 is the Small Computer System Interface (SCSI), then the SCSI SEND DIAGNOSTIC and RECEIVE DIAGNOSTIC may be used to determine the read/write head through which the read back data is verified. The SCSI WRITE AND VERIFY command may be used to perform the write and read back of the data to verify that the data was written correctly to the storage device 4. These commands are further described in the publication "SCSI Block Commands-2 (SBC-2)", Rev. 13, Mar. 20, 2004 (Copyright 2003 by Information Technology Industry Council (ITI)), which publication is incorporated herein by reference in its entirety. In alternative embodiments, alternative techniques may be used to determine which head was used for the write and read back verify operation. The storage device 4 is verified once all read/write heads currently being used are verified, as indicated by the verified flag 86 and used flag 84 for each head. If all the heads are not verified within a certain period of time by periodically performing the read back verify of data destaged from cache, then a write and read back verify may be performed with respect to all heads not yet checked after the time period has expired.

If (at block 202) the read back verify completed successfully for all heads being used, then the current VLRU list 26 is set (at block 204) to the other verify LRU list 20 or 22 not currently being used. After this first verify operation of all used heads, the storage controller 6 initiates operations (at block 206) to perform an additional read back verify for each used head in the storage device 4. If (at block 208) this second or any further subsequent read back verify for all heads completes, then the storage controller 6 appends (at block 210) the entries in the verify LRU list 20 or 22 not indicated in the current VRLU list 26 to the unmodified verify LRU list 24. The current VLRU list 26 is set (at block 212) to point to the other verify LRU list 20 or 22. Control then returns to block 206 to perform another verification of all the heads in the storage device. Whenever a new verification operation of all used heads is performed, the verified flag 86 for all the used heads are cleared.

With these operations, entries in the VLRU list 26 are not considered verified until the verification of the heads occurs twice. The reason for using two checks to verify the successful writing of tracks having entries in one VLRU list 20, 22 is that an entry for a track in cache 10 may be added to one VLRU list 20, 22 while the head verification is occurring, but before the verification completes, meaning that the data was not written before the head was verified. The second verification is performed so that entries added to a VLRU list 20 or 22 while a check of all the heads is occurring are not verified and demoted from cache 10 until a check of all the storage device 4 heads occurs after an entry is added to one VLRU 20 or 22 list. This ensures that the entry added to a VLRU list 20, 22 associated with an updated track that is written on a head is not verified until the head on which the data is written is verified in the second verification after the data is written.

If (at block 202 or 208) the read back for one head fails, then the storage device 4 is at risk for write dropping errors. In such case, data in the storage device set of storage units, such as hard disk drives, is recovered onto new storage device set not including the device, i.e., hard disk drive, having the head failure. For instance, if the storage device 4 comprises a set of interconnected hard disk drives configured as a RAID array, then the disk having the failed head may be swapped out and the data rebuilt using the RAID algorithm from the surviving disks. Updates in the cache 10 on the verify lists 20, 22, 24, which comprise updates to tracks in the storage device 4 that have not been verified as successfully written, are then written (at block 216) from the cache 10 to the storage device 4 to ensure that data not verified to be in the storage device 4 is written back. In this way, data that has been verified as being stored in the disk may be recovered and updates not verified as successfully written to the storage device 4 are recovered from cache 8 as indicated in the verify lists 20, 22, 24.

Figure 8:
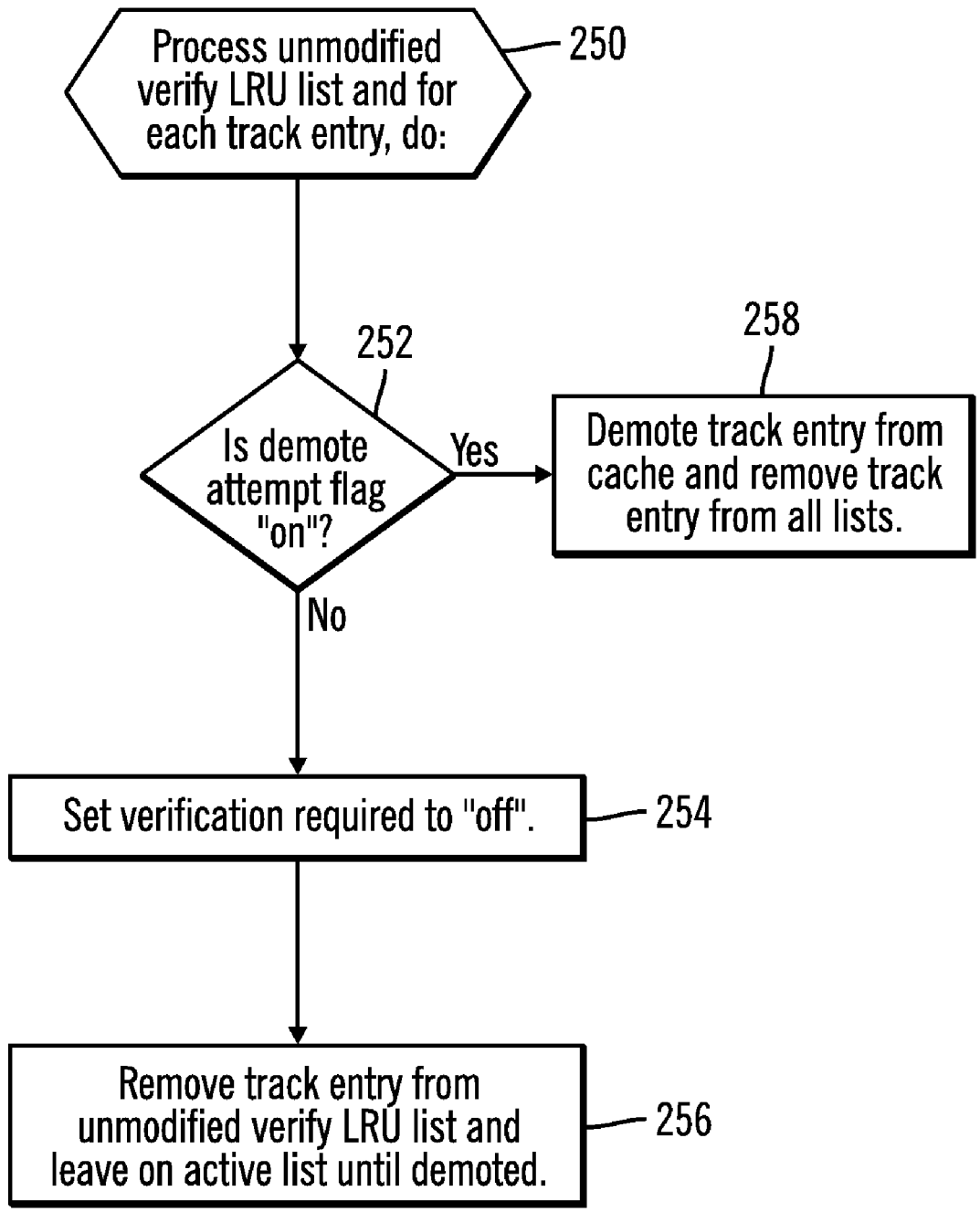

FIG. 8 illustrates operations for processing the unmodified VLRU list 24. For each entry in the unmodified VLRU list 24 (at block 250), the operations 252-258 are performed. If (at block 252) the demote attempt flag 74 is on, then the track is immediately demoted (at block 258) and the entry from all other lists for the demoted track is removed. This ensures that those tracks where demotion was previously attempted are immediately demoted to avoid further delays to writing the update of that track. If the demote attempt flag 74 is "off", then the verification required flag 76 is set (at block 254) to "off" and the track entry is removed (at block 256) from the unmodified verify LRU list 24 and left on the active list 16 eligible for demotion.

Described embodiments provide techniques for ensuring that data destaged to a storage device is removed from cache after the verifying that the storage device successfully completed writing the data to detect and avoid the drop write errors.

Additional Embodiment Details

The described embodiments for copying data between controllers may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the data was verified by checking all read/write heads through which the data is written. In alternative embodiments, different techniques may be used to verify that data was successfully written to the storage device other then verifying the operability of the read/write heads being used.

FIGS. 3 and 4 illustrate information maintained for track metadata and for a head verify information. In alternative embodiments, additional or different information may be maintained.

The illustrated operations of FIGS. 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
updating a track in a cache in response to a write request;
destaging the updated track from the cache to a storage device;
setting a verification required flag for the destaged track to indicate that verification is required in response to destaging the updated track from the cache;
returning complete to the write request before verifying that the storage device successfully completed writing the destaged track to the storage device;
retaining the destaged track in the cache;
verifying that the storage device is successfully completing writing data after the track is destaged;

indicating, in response to verifying that the storage device is successfully completing the writing of data, destaged tracks eligible for removal from the cache that were destaged before the storage device is verified by setting the verification required flags for the destaged tracks to indicate that verification is not required, wherein the destaged track is not indicated as eligible for removal from the cache until the storage device is verified after the track is destaged to the storage device;

initiating a demote operation to demote the retained destaged track in the cache;

determining whether the verification required flag for the destaged track to demote indicates that verification is required in response to initiating the demote operation; and demoting the destaged track from the cache in response to determining that the verification required flag indicates that verification is not required for the destaged track.

2. The method of claim 1, wherein the storage device comprises a hard disk drive having multiple read/write heads, wherein the read/write heads perform read/write operations with respect to one disk platter, and wherein the storage device is verified after verification that the storage device has successfully completed the writing of data to the read/write heads in the hard disk drive.

3. The method of claim 2, wherein verifying the read/write heads comprises:
    periodically performing a write and read back to verify one read/write head; and
    verifying read/write heads not yet verified in response to determining that used read/write heads have not been verified within a predetermined time period.

4. The method of claim 1, further comprising:
    indicating to retain the destaged tracks in the cache in response to destaging the destaged tracks;
    processing the destaged tracks in the cache to indicate as eligible for removal; and
    indicating the destaged tracks eligible for removal that are not indicated to retain in the cache in response to processing the destaged tracks.

5. The method of claim 4, further comprising:
    indicating to not retain the destaged tracks that were destaged before verifying the storage device in response to verifying that the storage device is successfully completing the writing of data; and
    demoting the destaged tracks not indicated to retain in the cache that were subject to a previous demote attempt while indicated as retained in the cache.

6. The method of claim 1, further comprising:
    recovering the data from the storage device to a new storage device in response to not verifying that the storage device is successfully completing the writing of data; and
    writing the retained destaged tracks from the cache to the storage device in response to recovering the data.

7. The method of claim 1, wherein the storage device comprises a plurality of interconnected storage units, wherein verifying that the storage device is successfully completing the writing of data comprises verifying that all interconnected storage units successfully complete writing data.

8. A system in communication with a storage device, comprising:
    a cache; and
    circuitry coupled to the cache and enabled to:
        update a track in the cache in response to a write request;
        destage the updated track from the cache to the storage device;
        set a verification required flag for the destaged track to indicate that verification is required in response to destaging the updated track from the cache;
        return complete to the write request before verifying that the storage device successfully completed writing the destaged track to the storage device;
        retain the destaged track in the cache;
        verify that the storage device is successfully completing writing data after the track is destaged; and
        indicate, in response to verifying that the storage device is successfully completing the writing of data, destaged tracks eligible for removal from the cache that were destaged before the storage device is verified by setting the verification required flags for the destaged tracks to indicate that verification is not required, wherein the destaged track is not indicated as eligible for removal from the cache until the storage device is verified after the track is destaged to the storage device;
        initiate a demote operation to demote the retained destaged track in the cache;
        determine whether the verification required flag for the destaged track to demote indicates that verification is required in response to initiating the demote operation; and
        demote the destaged track from the cache in response to determining that the verification required flag indicates that verification is not required for the destaged track.

9. The system of claim 8, wherein the storage device comprises a hard disk drive having multiple read/write heads, wherein the read/write heads perform read/write operations with respect to one disk platter, and wherein the storage device is verified after verification that the storage device has successfully completed the writing of data to the read/write heads in the hard disk drive.

10. The system of claim 9, wherein verifying the read/write heads comprises:
    periodically performing a write and read back to verify one read/write head; and
    verifying read/write heads not yet verified in response to determining that used read/write heads have not been verified within a predetermined time period.

11. The system of claim 8, wherein the circuitry is further enabled to:
    indicate to retain the destaged tracks in the cache in response to destaging the tracks;
    process the destaged tracks in the cache to indicate as eligible for removal; and
    indicate the destaged tracks eligible for removal that are not indicated to retain in the cache in response to processing the tracks.

12. The system of claim 11, wherein the circuitry is further enabled to:
    indicate to not retain the destaged tracks that were destaged before verifying the storage device in response to verifying that the storage device is successfully completing the writing of data; and
    demote the destaged tracks not indicated to retain in the cache that were subject to a previous demote attempt while indicated as retained in the cache.

13. The system of claim 8, wherein the circuitry is further enabled to:
    recover the data from the storage device to a new storage device in response to not verifying that the storage device is successfully completing the writing of data; and write the retained destaged tracks from the cache to the storage device in response to recovering the data.

14. The system of claim 8, wherein the storage device comprises a plurality of interconnected storage units, wherein verifying that the storage device is successfully completing the writing of data comprises verifying that all interconnected storage units successfully complete writing data.

15. An article of manufacture comprising a computer readable storage medium having code executed to communicate with a cache and storage device and to perform operations, the operations comprising:
   updating a track in the cache in response to a write request;
   destaging the updated track from the cache to the storage device;
   setting a verification required flag for the destaged track to indicate that verification is required in response to destaging the updated track from the cache;
   returning complete to the write request before verifying that the storage device successfully completed writing the destaged track to the storage device;
   retaining the destaged track in the cache;
   verifying that the storage device is successfully completing writing data after the track is destaged;
   indicating, in response to verifying that the storage device is successfully completing the writing of data, destaged tracks eligible for removal from the cache that were destaged before the storage device is verified by setting the verification required flags for the destaged tracks to indicate that verification is not required, wherein the destaged track is not indicated as eligible for removal from the cache until the storage device is verified after the track is destaged to the storage device;
   initiating a demote operation to demote the retained destaged track in the cache;
   determining whether the verification required flag for the destaged track to demote indicates that verification is required in response to initiating the demote operation; and
   demoting the destaged track from the cache in response to determining that the verification required flag indicates that verification is not required for the destaged track.

16. The article of manufacture of claim 15, wherein the storage device comprises a hard disk drive having multiple read/write heads, wherein the read/write heads perform read/write operations with respect to one disk platter, and wherein the storage device is verified after verification that the storage device has successfully completed the writing of data to the read/write heads in the hard disk drive.

17. The article of manufacture of claim 16, wherein verifying the read/write heads comprises:
   periodically performing a write and read back to verify one read/write head; and
   verifying the read/write heads not yet verified in response to determining that used read/write heads have not been verified within a predetermined time period.

18. The article of manufacture of claim 15, wherein the operations further comprise:
   indicating to retain the destaged tracks in the cache in response to destaging the tracks;
   processing the destaged tracks in the cache to indicate as eligible for removal; and
   indicating the destaged tracks eligible for removal that are not indicated to retain in the cache in response to processing the destaged tracks.

19. The article of manufacture of claim 18, wherein the operations further comprise:
   indicating to not retain the destaged tracks that were destaged before verifying the storage device in response to verifying that the storage device is successfully completing the writing of data; and
   demoting tracks not indicated to retain in the cache that were subject to a previous demote attempt while indicated as retained in the cache.

20. The article of manufacture of claim 15, wherein the operations further comprise:
   recovering the data from the storage device to a new storage device in response to not verifying that the storage device is successfully completing the writing of data; and
   writing the retained destaged tracks from the cache to the new storage device in response to recovering the data.

21. The article of manufacture of claim 15, wherein the storage device comprises a plurality of interconnected storage units, wherein verifying that the storage device is successfully completing the writing of data comprises verifying that all interconnected storage units successfully complete writing data.

22. The method of claim 1, further comprising:
   storing the updated track in the cache in a storage unit;
   removing the updated track from the storage unit in response to destaging the track from the cache to the storage device, wherein the destaged track removed from the storage unit is retained in the cache until the verifying that the storage device is successfully completing the writing of data.

23. The method of claim 22, wherein the storage unit comprises a non-volatile storage unit separate from the storage device.

24. The system of claim 8, further comprising:
   a storage unit;
   wherein the circuitry is further enabled to:
      store the updated track in the cache in the storage unit; and
      remove the updated track from the storage unit in response to destaging the track from the cache to the storage device, wherein the destaged track removed from the storage unit is retained in the cache until the verifying that the storage device is successfully completing the writing of data.

25. The system of claim 24, wherein the storage unit comprises a non-volatile storage unit separate from the storage device.

26. The article of manufacture of claim 15, wherein the operations further comprise:
   storing the updated track in the cache in a storage unit;
   removing the updated track from the storage unit in response to destaging the track from the cache to the storage device, wherein the destaged track removed from the storage unit is retained in the cache until the verifying that the storage device is successfully completing the writing of data.

27. The article of manufacture of claim 26, wherein the storage unit comprises a non-volatile storage unit separate from the storage device.

28. The method of claim 1, further comprising:
   setting an attempted demote flag to indicate an attempted demotion for the destaged track in response to determining that the verification required flag indicates that verification is required in response to initiating the demotion operation for the destaged track;
   determining whether the demote attempt flag for the destaged track indicates that verification is required after verifying that the storage device successfully completed the writing of the destaged track;

demoting the destaged track from the cache in response to determining that the demote attempt flag indicates that there was an attempted demotion of the destaged track from the cache; and setting the verification required flag to indicate that verification is not required in response to determining that the demote attempt flag indicates that there not was an attempted demotion of the destaged track from the cache.

29. The system of claim 8, wherein the circuitry is further enabled to:

set an attempted demote flag to indicate an attempted demotion for the destaged track in response to determining that the verification required flag indicates that verification is required in response to initiating the demotion operation for the destaged track;

determine whether the demote attempt flag for the destaged track indicates that verification is required after verifying that the storage device successfully completed the writing of the destaged track;

demote the destaged track from the cache in response to determining that the demote attempt flag indicates that there was an attempted demotion of the destaged track from the cache; and set the verification required flag to indicate that verification is not required in response to determining that the demote attempt flag indicates that there was not an attempted demotion of the destaged track from the cache.

30. The article of manufacture of claim 15, wherein the operations further comprise:

setting an attempted demote flag to indicate an attempted demotion for the destaged track in response to determining that the verification required flag indicates that verification is required in response to initiating the demotion operation for the destaged track;

determining whether the demote attempt flag for the destaged track indicates that verification is required after verifying that the storage device successfully completed the writing of the destaged track;

demoting the destaged track from the cache in response to determining that the demote attempt flag indicates that there was an attempted demotion of the destaged track from the cache; and setting the verification required flag to indicate that verification is not required in response to determining that the demote attempt flag indicates that there was not an attempted demotion of the destaged track from the cache.

* * * * *